Figure 1:
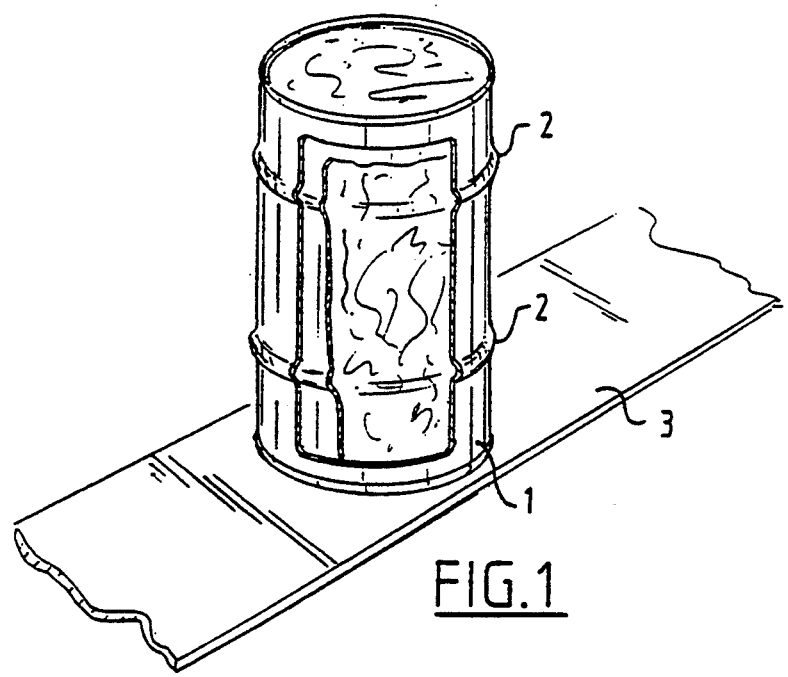

United States Patent [19]

Martens

[11] Patent Number: 5,362,509
[45] Date of Patent: Nov. 8, 1994

[54] METHOD AND APPARATUS FOR MAKING A FROZEN MASS OF DRINKABLE PRODUCT READY FOR TREATMENT

[75] Inventor: Johannes C. A. Martens, Oosterhout, Netherlands

[73] Assignee: Typhoon-Martens B.V., Raamsdonksveer, Netherlands

[21] Appl. No.: 87,717

[22] PCT Filed: Nov. 13, 1992

[86] PCT No.: PCT/NL92/00201
§ 371 Date: Jul. 12, 1993
§ 102(e) Date: Jul. 12, 1993

[87] PCT Pub. No.: WO93/09684
PCT Pub. Date: May 27, 1993

[30] Foreign Application Priority Data

Nov. 13, 1991 [NL] Netherlands .................. 9101890

[51] Int. Cl.$^5$ .............................................. F25C 5/00
[52] U.S. Cl. ......................................... 426/524; 62/73; 426/416
[58] Field of Search ................... 426/524, 518, 416; 99/483; 62/73, 320

[56] References Cited

U.S. PATENT DOCUMENTS 2,863,776  12/1958  Lisher .................. 426/524
4,404,810   9/1983  Garland ................. 62/73
4,906,486   3/1990  Young .................. 426/524

FOREIGN PATENT DOCUMENTS 0207899  1/1987  European Pat. Off. .
2416649  9/1979  France .
2708560  8/1978  Germany .

OTHER PUBLICATIONS

T. Hattori, "Thawing Tank Apparatus for Frozen Particle", Patent Abstracts of Japan, vol. 13, No. 249 (C-605) (3597).

*Primary Examiner*—George Yeung
*Attorney, Agent, or Firm*—Wegner, Cantor Mueller & Player

[57] ABSTRACT

A method of treating a frozen mass of drinkable product the frozen mass being stored in a frozen state in a container, including heating the container on all sides for a predetermined time so as to thaw an outside layer of the frozen mass, removing the frozen mass from the container, mechanically dividing the frozen mass into a plurality of frozen pieces, and supplying heat to the plurality of frozen pieces such that a maximum temperature of an obtained liquid is from 2° C. to 5° C. A device for treating a frozen mass of drinkable product stored as a frozen mass in a container, including a carrier for the container, heat supply structure for thawing an outside layer of the frozen mass arranged close to the carrier, a station for emptying the container, a flaking apparatus for dividing the frozen mass into a plurality of frozen pieces, and a heat exchanger for supplying heat to the plurality of frozen pieces, the heat exchanger including a transport tube connected to a transport pump and heat structure for supplying heat to a fluid within the transport tube arranged along the transport tube.

17 Claims, 3 Drawing Sheets

METHOD AND APPARATUS FOR MAKING A FROZEN MASS OF DRINKABLE PRODUCT READY FOR TREATMENT

The invention relates to a method for making a frozen mass drinkable product ready for treatment, such as fruit juice or the like, which mass is stored in frozen state in a container.

Fruit juices are usually condensed into concentrates in the country of origin, stored in a container, deep frozen and subsequently transported to the country of consumption. There the concentrated juice can be further processed into drinkable products. In this process it has been found to be a problem to get the relatively large frozen mass out of the container easily and to then defrost it without there being any loss of quality.

The invention has for its object to provide a method with which this drawback is obviated, which method is distinguished by the following steps of:
heating the container on all sides for a predetermined time,
removing the frozen mass from the container,
mechanically dividing the frozen mass into pieces, and
supplying heat to this mass in stepwise manner, such that the maximum temperature of the obtained liquid amounts preferably to 2° C. and to a maximum of 5° C.

Since the container is heated on all sides, only a small part of the outer skin layer of the frozen mass has to be melted to be able to remove this mass as a block from the container. This block is then reduced so that while frozen flakes are created, they are nevertheless transportable. The drawback to transport by means of a pressure pump is that the fragments cake together again, so that it has to be heated again directly thereafter to remain sufficiently fluid and transportable. The heat supply according to the invention takes place in stepwise manner so that the temperature of the frozen mass can continually be measured at interim intervals, wherein the maximum temperature of 5° C. for the end product is certainly not exceeded. This ensures a high quality of the end product.

The invention further relates to a device for performing the above stated method, which device is distinguished by a carrier for the container, heat supply means arranged close to the carrier, a station for emptying the container, a flaking apparatus for dividing the frozen mass into pieces and a heat exchanger for supplying heat, which exchanger is embodied as a transport tube of certain length which is connected to a transport pump and along which heat means are arranged.

The tube is preferably divided into sections wherein each section is provided with a temperature sensor, the measurement signal of which is used to control the heat supply in at least the following section. In a preferred embodiment the tube is arranged in the form of a serpentine, wherein one or more parts of the serpentine form a section.

According to a further development of the invention the tube is double-walled, in the inner tube of which the frozen mass is transported by the transport pump and the outer tube is connected to a feed apparatus for a warm liquid medium.

Figure 2:
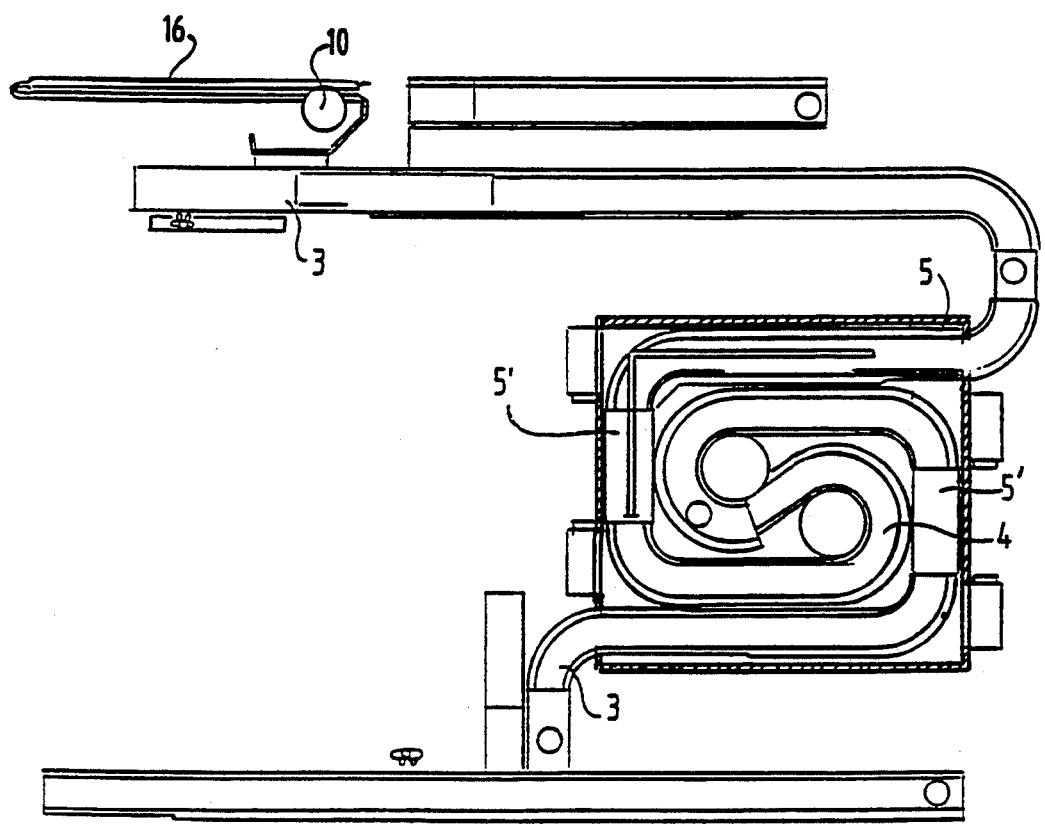
Figure 3:
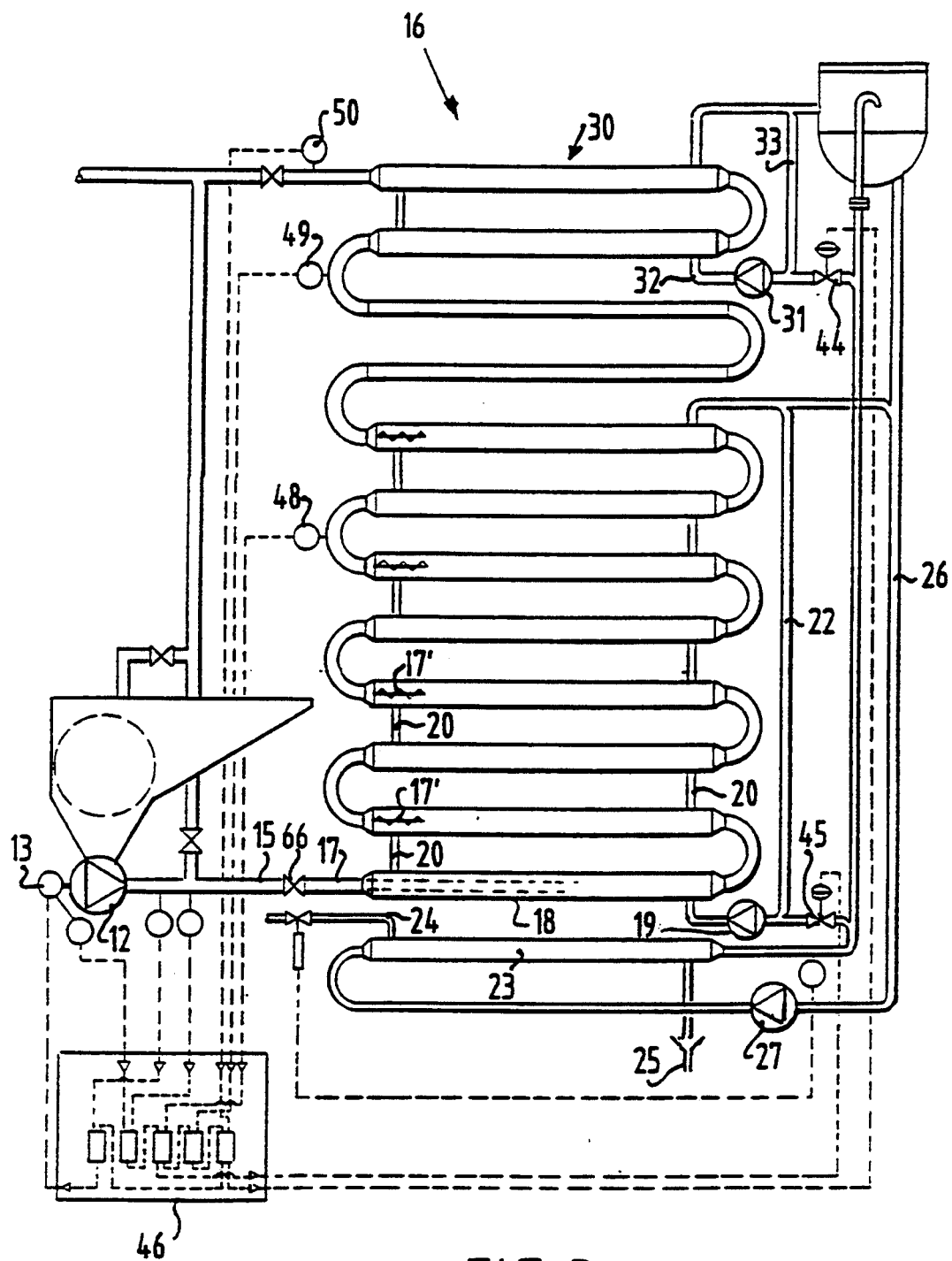
Figure 4:
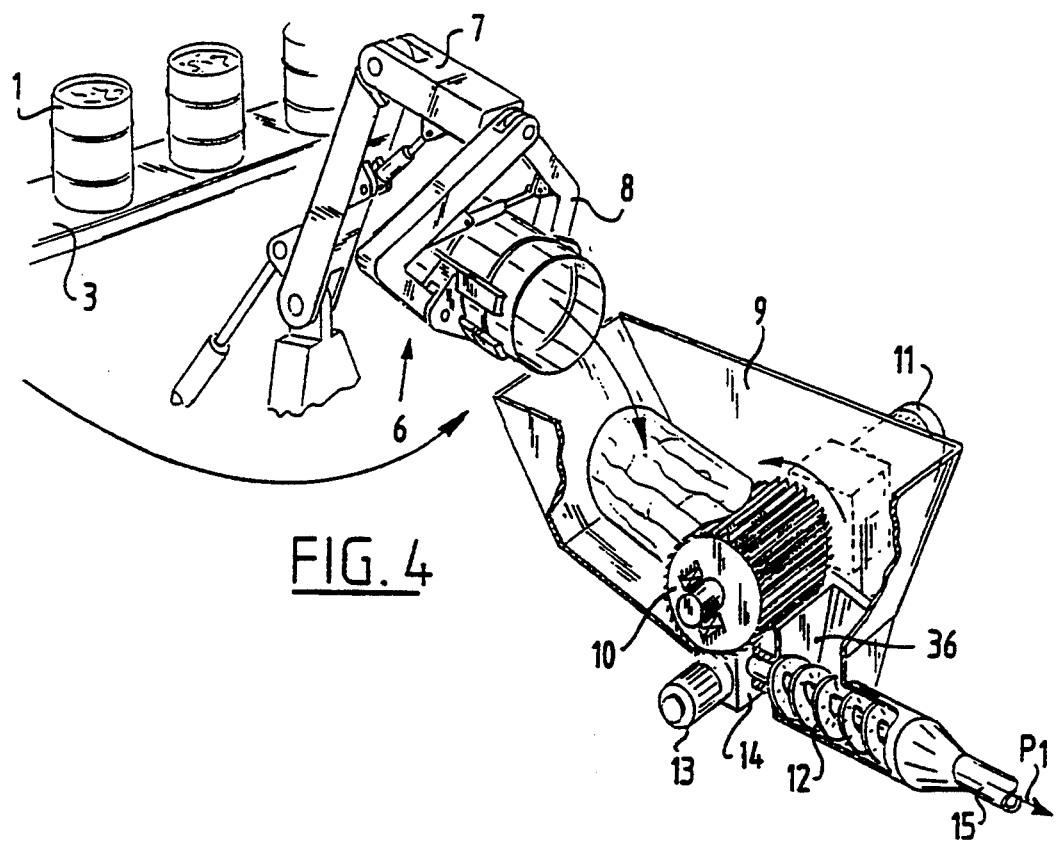
Figure 5:
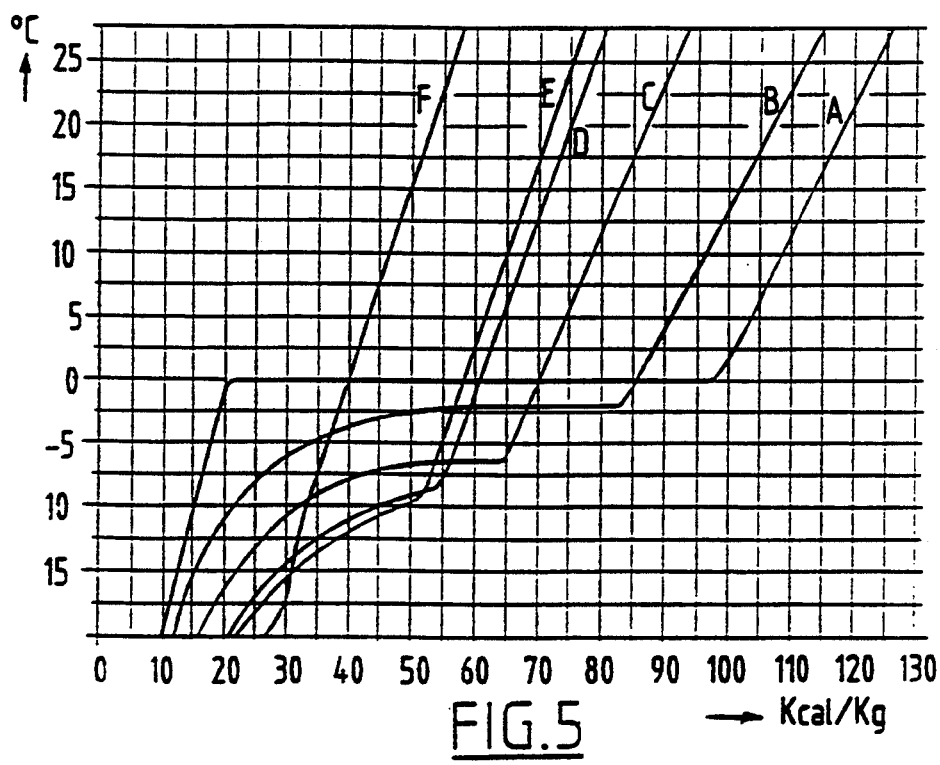

Above mentioned and other features will be elucidated further in the following figure description of an embodiment. In the drawing:

FIG. 1 shows a perspective view of a transport container with frozen contents on a carrier,
FIG. 2 shows a schematic top view of a transporting device for containers of FIG. 1, wherein the carrier is embodied as conveyor on the end of which is shown a station for emptying the container and a heat exchanger,
FIG. 3 shows a diagram of a preferred embodiment of the heat exchanger according to the invention,
FIG. 4 shows a perspective view of a tipping device with flaking apparatus according to the invention,
FIG. 5 shows a diagram of the temperature curve of different concentrates relative to water subject to the amount of heat supplied.

The container 1 shown in FIG. 1, also called a drum, has the known form, that is substantially cylindrical with two protruding ribs 2 along the outer periphery thereof. The container is provided with a closed bottom and a removable cover, the latter not being shown here.

Because of the fact that the ribs 2 are arranged, a frozen mass, such as for example frozen fruit juice, cannot be poured directly out of the container because the ribs of the ice block protrude into the hollow sides of the ribs 2 of the container.

For this purpose the container has to be heated on the outside in order to slightly melt the ribs of the ice block and the outer periphery thereof. This temperature increase may however not be such that the quality of the fruit juice is adversely affected.

According to the invention the container 1 stands on a carrier 3 which in the embodiment shown, FIG. 2, is embodied with a meander-shaped portion 4. Here the carrier 3 can be embodied as a roller conveyor wherein transport of the containers 1 can take place by means of a chain of carrier elements or the like (not shown).

The meander-shaped portion 4 of the conveyor is arranged in a space 5 closed on all sides into which hot air is fed which is generated by a heating apparatus 5'. Due to the meander-shaped configuration of the conveyor the closed space can be kept small and still be of sufficient heating capacity.

The heat supply is herein such that only a 2 cm thick layer on the outside of the frozen block is thawed, whereby it becomes possible to remove the block from the container on a further part of the conveyor belt 3 at a tipping apparatus for emptying the container.

Once the block has been removed from the container it can be reduced in a flaking apparatus.

FIG. 4 shows such a station for emptying the container and flaking the frozen block from the container.

In a tipping device 6 in the form of a gripper 8 coupled to a two-jointed pivot arm 7, one container at a time can be grasped between the claws of the gripper 8 and then tilted above a trough 9 at the side of the conveyor 3. The trough 9 is shaped such that the cylindrical block comes to rest with the head end against a scraping roller 10 arranged in the trough 9. Under the influence of gravity the block remains lying against the roller 10 so that by rotating the roller 10 by means of a drive motor 11 a portion of the block is scraped off at a time. The flakes come to lie in the bottom of the trough 9 and run via an outlet 36 into the inlet of a transport pump, here in the form of a screw pump 12. The screw is driven by the motor 13 via a right-angled transmission 14. The screw transporter moves the scraped frozen flakes in the direction of the arrow P1 to a transport tube 15. This transport tube leads to a tube heat exchanger 16.

The tube heat exchanger is further elucidated in detail with reference to FIG. 3.

The tube 15 connects via a closing valve 66 to a transport tube 17 placed in serpentine shape which takes a double-walled form locally at 18. In the straight tube portions of transport tube 17 static mixers can be arranged in the form of screw elements 17', which ensure that the frozen mass continually remains in motion not only in axial but also in peripheral sense of the tube 17. Since each straight tube portion of the tube 17 is provided with an outer tube 18 a heat medium can be fed therebetween. The heat medium, for example water, is carried by means of the pump 19 to the space between the tube portions 17, 18, which water flows in each case via the connecting pipes 20 with the following straight tube portion 17. After a number of straight tube portions 17 the water is collected and transported back to the pump 19 via return pipe 22.

In order to enable heating of the water the water can be pre-heated in a heat exchanger 23, which heat exchanger is likewise double-walled, the outer wall of which is connected to a steam heater, which steam is supplied in the feed pipe 24 and discharged in the pipe 25. A part of the water past the return pipe 22 can herein be transported in a second return pipe 26 to the heat exchanger 23, wherein the transport is ensured by a pump 27.

Likewise arranged in the rear part of the heat exchanger 16 is a double-walled tube portion 30 which can likewise be heated by way of water, which circuit is fed by a pump 31 with feed pipe 32 and return pipe 33.

An adjustable valve 44 is arranged between this circuit.

An adjustable valve 45 is likewise arranged on the intake side of pump 19. These valves are controlled by a control cabinet 46 which also controls the transport screw pump motor 13. Finally, temperature sensors are placed at predetermined locations on the transport tube 17, which are indicated by 48, 49 and 50.

Using the temperature sensors 48, 49 and 50 the temperature of the mass present in the transport tube 17 can be repeatedly monitored so that if the temperature is too high the supply of heating medium can be reduced. Conversely, the supply can be increased if the temperature is too low, whereby the valves 44 and 45 are accordingly closed and opened respectively. Because of the inaccurately adjustable valves the heat supply is sometimes too little and sometimes too much.

It must therefore also be established according to the invention whether the temperature at sensor 48 is sufficient to render inoperative the after-heating at the part 30 of the heat exchanger, respectively to supply extra heat. This is applied such that the temperature sensor 50 may never indicate more than a maximum of 5° C.

Such a control is of particular importance because the amount of heat to be supplied depends on the momentary heat content of the frozen mass. For the purpose of elucidation reference is made in FIG. 5 to the temperature lines, wherein the temperature of the concentrate is indicated on the vertical axis and the required heat supply on the horizontal axis. Should the mass consists of pure water ice, then the curve designated with A is followed. The curves B, C, D, E, F are followed depending on the type of concentrate. Because of the horizontal portion in the temperature line it is difficult to establish whether the correct amount of heat has already been supplied. Should the temperature 0° C. have been reached for the curve A, then it is not possible to measure how much heat must still be supplied or that sufficient heat has already been supplied to finally obtain the temperature of 5° C. maximum in the liquid product.

Because of this uncertainty the heat exchanger 16 according to FIG. 3 is divided into sections with the associated temperature sensors 48, 49 and 50. Should temperature sensor 49 already indicate 1° C., then hardly any more heat need be supplied in the last section of the heat exchanger 16. If the temperature sensor 49 still has a 0° C. indication, then heat, albeit relatively little heat, will have to be supplied additionally, because the ice mass is still situated in the straighter part of the horizontal portion of the temperature line.

The invention is not limited to the above described embodiment.

I claim:

1. A method of treating a frozen mass of drinkable product wherein said frozen mass is stored in a frozen state in a container, comprising heating the container on all sides for a predetermined time so as to thaw an outside layer of said frozen mass, removing the frozen mass from the container, mechanically dividing the frozen mass into a plurality of frozen pieces, and supplying heat to the plurality of frozen pieces such that a maximum temperature of an obtained liquid is from 2° C. to 5° C.

2. A device for treating a frozen mass of drinkable product stored as a frozen mass in a container, comprising a carrier for the container, heat supply means for thawing an outside layer of the frozen mass arranged close to the carrier, a station for emptying the container, a flaking apparatus for dividing the frozen mass into a plurality of frozen pieces, and a heat exchanger for supplying heat to the plurality of frozen pieces, wherein said heat exchanger comprises a transport tube connected to a transport pump and heat means for supplying heat to a fluid within the transport tube arranged along the transport tube.

3. Device as claimed in claim 2, wherein the transport tube is divided into sections, wherein each section is provided with a temperature sensor which is coupled to a control unit for the heat supply means in the section.

4. Device as claimed in claim 2, wherein the transport tube has a serpentine shape.

5. Device as claimed in claim 2, wherein the transport tube is double-walled so as to define an inner tube and an outer tube, the inner tube is connected to the transport pump and the outer tube is connected to a feed apparatus for a warm liquid medium.

6. Device as claimed in claim 2, wherein the carrier comprises a conveyor belt having a meander-shaped form.

7. Device as claimed in claim 2, wherein the flaking apparatus is formed as a blade roller and an intake of a transporter is directed toward an underside of the blade roller.

8. Device as claimed in claim 6, wherein the meander-shaped portion of the conveyor is held in a closed space provided with heat supply means.

9. Device as claimed in claim 3, wherein the transport tube has a serpentine shape.

10. Device as claimed in claim 3, wherein the transport tube is double-walled so as to define an inner tube and an outer tube, the inner tube is connected to the transport pump and the outer tube is connected to a feed apparatus for a warm liquid medium.

11. Device as claimed in claim 4, wherein the transport tube is double-walled so as to define an inner tube and an outer tube, the inner tube is connected to the transport pump and the outer rube is connected to a feed apparatus for a warm liquid medium.

12. Device as claimed in claim 3, wherein the carrier comprises a conveyor belt with a meander-shaped form.

13. Device as claimed in claim 4, wherein the carrier comprises a conveyor belt with a meander-shaped form.

14. Device as claimed in claim 5, wherein the carrier comprises a conveyor belt with a meander-shaped form.

15. Device as claimed in claim 3, wherein the flaking apparatus is formed as a blade roller and an intake of a transporter is directed toward an underside of the blade roller.

16. Device as claimed in claim 4, wherein the flaking apparatus is formed as a blade roller and an intake of a transporter is directed toward an underside of the blade roller.

17. Device as claimed in claim 5, wherein the flaking apparatus is formed as a blade roller and an intake of a transporter is directed toward an underside of the blade roller.

* * * * *